United States Patent [19]

Goswami et al.

[11] 4,147,853

[45] Apr. 3, 1979

[54] INTERNALLY PLASTICIZED VINYL CHLORIDE COPOLYMER

[75] Inventors: Jagadish C. Goswami, New City; Robert Querido, South Spring Valley, both of N.Y.

[73] Assignee: Stauffer Chemical Company, Westport, Conn.

[21] Appl. No.: 857,051

[22] Filed: Dec. 5, 1977

Related U.S. Application Data

[63] Continuation-in-part of Ser. No. 801,957, May 31, 1977, which is a continuation-in-part of Ser. No. 763,185, Jan. 27, 1977, abandoned.

[51] Int. Cl.$^2$ .................... C08F 30/02; C08F 230/02
[52] U.S. Cl. ................. 526/278; 260/18 PF; 260/18 N; 260/23 XA; 526/88; 526/200; 526/230.5
[58] Field of Search ............... 526/278, 242, 200

[56] References Cited

U.S. PATENT DOCUMENTS

| | | | |
|---|---|---|---|
| 3,706,686 | 12/1972 | Eilers et al. | 260/23 XA |
| 3,725,359 | 4/1973 | Goswami et al. | 526/278 |
| 3,726,839 | 4/1973 | Jin | 526/278 |
| 3,792,113 | 2/1974 | Goswami et al. | 526/278 |
| 3,819,770 | 6/1974 | Kraft et al. | 526/278 |
| 3,948,842 | 4/1976 | Kraft et al. | 526/278 |
| 3,983,294 | 9/1976 | Goswami et al. | 526/278 |
| 3,993,715 | 11/1976 | Hwa et al. | 526/278 |

FOREIGN PATENT DOCUMENTS 959376 9/1960 United Kingdom.

*Primary Examiner*—Herbert J. Lilling
*Attorney, Agent, or Firm*—Richard P. Fennelly

[57] ABSTRACT

An internally plasticized copolymer of from about 50% to about 85%, by weight, vinyl chloride, from about 3% to about 47%, by weight, of a $C_6$–$C_{10}$ alkyl acrylate, and from about 3% to about 47%, by weight, of a bis(hydrocarbyl)vinylphosphonate is disclosed. This copolymer can be formed by using conventional suspension, emulsion, solution or bulk polymerization procedures and can be utilized without any substantial amount of added external plasticizer in those applications in which externally plasticized vinyl chloride polymers are normally used. The use of such a resin overcomes the plasticizer migration problems associated with externally plasticized polyvinyl chloride systems.

14 Claims, No Drawings

INTERNALLY PLASTICIZED VINYL CHLORIDE COPOLYMER

This application is a continuation-in-part of U.S. Serial No. 801,957, filed May 31, 1977, which in turn was a continuation-in-part of U.S. Ser. No. 763,185, filed Jan. 27, 1977, now abandoned.

BACKGROUND OF THE INVENTION

1. Field of the Invention

The present invention relates to an internally plasticized copolymer of vinyl chloride, an alkyl acrylate and a bis (hydrocarbyl)vinylphosphonate.

2. Description of the Prior Art

External plasticizers in vinyl chloride homo- and copolymers are commonly employed today to form products having the required degree of flexibility for a given purpose. Such external plasticization, however, it not entirely satisfactory since the plasticizer tends to migrate to the surface and eventually is lost either by volatilization or extraction. This loss gives rise to such problems as surface stickiness, automotive windshield fogging and embrittlement of vinyl films containing the polymer which are used in such applications as shower curtains, baby pants, vinyl seat covers, and the like. Hence, various proposals for "internal plasticization" of vinyl chloride polymers have been made wherein the plasticizing action is supplied by one or more comonomers for vinyl chloride which are polymerized with the vinyl chloride to form the polymer.

The use of copolymers of a vinyl monomer and a polymerizable polyester, for example, an acrylate or a vinyl ester of a polyester of an aliphatic hydroxycarboxylic acid, was proposed in U.S. Pat. No. 3,640,927 to C. S. Marvel et al. An internally plasticized, two component vinyl chloride copolymer containing from about 75% to about 95% vinyl chloride and about 25% to about 5% of an ester of an unsaturated mono- or polycarboxylic acid, e.g., a $C_6$-$C_{12}$ alkyl maleate, fumarate or acrylate, was proposed in U.S. Pat. No. 3,544,661 to A. Oth et al. A four component polymer composition vinyl chloride, a dialkyl maleate or fumarate, an alkyl ester of acrylic or methacrylic acid and a monohydrogen, monoalkyl maleate or fumarate was proposed in U.S. Pat. No. 3,196,133 to R. A. Piloni et al. for use as a solvent-based coating having both good adhesiveness and flexibility. In copending U.S. Ser. No. 795,990 filed May 11, 1977, by R. E. Gallagher et al. an internally plasticized copolymer of vinyl chloride, a $C_1$-$C_{10}$ alkyl acrylate and a $C_8$-$C_{22}$ dialkyl maleate or fumarate is disclosed.

Two component copolymers of vinyl chloride and such acrylates as 2-ethylhexyl acrylate, as seemingly suggested by certain portions of the Oth et al. patent produce heterogeneous resin compositions which do not show the desirable performance properties of flexible vinyl films of the present invention.

A variety of two component vinyl chloride/vinylphosphonate copolymers are known which cannot be classified as internally plasticized copolymers (U.S. Pat. Nos. 3,691,127, 3,792,113 and 3,819,770) since copolymerizing just vinyl chloride and a bis(hydrocarbyl)-vinylphosphonate, e.g., bis(beta chloroethyl) vinylphosphonate, leads to production of a resin which gives a hard, relatively unflexible film requiring external plasticization. It does not appear to have been hitherto appreciated that a vinyl chloride/acrylate/vinylphosphonate copolymer, as described and claimed herein, would have flexibility characteristics as well as performance properties equivalent in many respects to externally platicized polyvinyl chloride without having to add a substantial amount of external plasticizer. Unexpectedly, the bis(hydrocarbyl)vinylphosphonate monomer aids in rendering the terpolymer less heterogeneous in appearance and resulting properties than if only vinyl chloride and an alkyl acrylate were used as comomers as suggested by certain prior art patents. The copolymers also has reduced smoke generation characteristics.

SUMMARY OF THE PRESENT INVENTION

The copolymer of the present invention is an internally plasticized vinyl chloride copolymer of from about 50% to about 85%, by weight, vinyl chloride, from about 3% to about 47%, by weight, of a $C_6$-$C_{10}$ alkyl acrylate, e.g., 2-ethylhexyl acrylate, and from about 3% to about 47%, by weight, of a bis(hydrocarbyl) vinylphosphonate, e.g., bis(beta-chloroethyl)vinylphosphonate. The copolymer is formed using conventional suspension, emulsion, bulk and solution polymerization techniques and can be used in those applications where externally plasticized polyvinyl chloride is used, e.g., as a vinyl film or sheeting material, in vinyl wire and cable insulation, as vinyl flooring, and as bag and tubing for blood transfusion equipment.

DESCRIPTION OF THE PREFERRED EMBODIMENTS

It has been unexpectedly found that a flexible vinyl film prepared from an internally plasticized vinyl chloride polymer without any external plasticization exhibits a Clash-Berg value of about 0° C. or below, preferably about −15° C. or below, and a tensile strength at break of at least about 60 kg./cm.$^2$ or higher, preferably about 85 kg./cm.$^2$ or greater. Such an internally plasticized polymer can be formed with conventional emulsion, suspension, bulk and solution polymerization procedures by using a basic three component monomer charge which contains certain amounts of vinyl chloride, a $C_6$-$C_{10}$ alkyl acrylate, and a bis(hydrocarbyl) vinylphosphonate, e.g., bis(beta-chloroethyl)vinylphosphonate. The invention is, more particularly, an internally plasticized copolymer which contains from about 50% to about 85%, by weight, of vinyl chloride, from about 3% to about 47%, by weight, of a $C_6$-$C_{10}$ alkyl acrylate, and from about 3% to about 47%, by weight, of a bis(hydrocarbyl)vinylphosphonate copolymerized therein.

The terminology "bis(hydrocarbyl)vinylphosphonate" as used in the present application is meant to encompass vinylphosphonates having the formula:

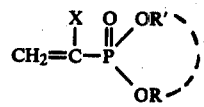

wherein X is selected from the group consisting of hydrogen, halogen, cyano, aryl, such as phenyl, $C_1$-$C_{18}$ alkyl and

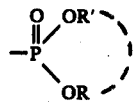

wherein R and R' are hydrocarbyl and substituted hydrocarbyl groups consisting essentially of hydrogen and carbon, and containing up to about 18 carbon atoms inclusive, with the proviso that R and R' may be the same, different or conjoint, i.e., R and R' may combine to form one single radical.

The use, in this disclosure, of the expression "hydrocarbyl" and "substituted hydrocarbyl groups" in the definition of the suitable bis(hydrocarbyl)vinylphosphonates given hereinabove refers to the radicals obtained upon the removal of a hydrogen from a hydrocarbon or substituted hydrocarbon group which may be either an aliphatic or aromatic group. These hydrocarbyl groups may be substituted with any non-interfering groups, i.e., with any group which does not interfere with the polymerization of the bis(hydrocarbyl)vinylphosphonate. Such substituent groups include, for example, chloro, bromo, fluoro, nitro, hydroxy, sulfone, ethoxy, methoxy, nitrile, ether, ester and keto groups and the like.

Illustrative of the aliphatic and aromatic groups as represented by R and R' in the structure of the bis(hydrocarbyl) vinylphosphonate given hereinabove are alkyl groups, such as methyl, ethyl, propyl, butyl, pentyl, hexyl, nonyl, and the like; alkenyl groups, such as pentenyl and hexenyl groups and all of their respective isomers; cycloalkyl groups, such as cyclopropyl, cyclobutyl, cyclopentyl, cyclohexyl and the like; cycloalkenyl groups, such as cyclohexenyl and the like; typical aryl groups include phenyl, benzyl, phenethyl, tolyl, naphthyl and the like.

Representative of the above-defined bis(hydrocarbyl)vinylphosphonates are:

Bis(beta-chloroethyl)vinylphosphonate;
Bis(2-ethylhexyl)vinylphosphonate;
Bis(beta-chloropropyl)vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate
Diethyl vinylphosphonate;
Bis(omega-chlorobutyl)vinylphosphonate;
Di-n-butyl vinylphosphonate;
Di-isobutyl vinylphosphonate;
Bis(2-chloroisopropyl) 1-methylvinylphosphonate
Diphenyl vinylphosphonate; and
Bis(2,3-dibromopropyl)vinylphosphonate From the above group of bis(hydrocarbyl)vinylphosphonate monomers, it is preferred to employ bis(beta-chloroethyl) vinylphosphonate in preparing the novel polymers of this invention since this monomer is a commercially available material, lower in cost than any of the other bis(hydrocarbyl)vinylphosphonates. Bis(2-ethylhexyl)vinylphosphonate is also a preferred monomer since it gives a product having very desirable physical properties such as good low temperature flexibility.

Representative $C_6$–$C_{10}$ alkyl acrylates which can be used in the practice of the present invention include n-hexyl acrylate, cyclohexyl acrylate, n-octyl acrylate, 2-ethylhexyl acrylate, and mixtures of the foregoing acrylates. The $C_8$–$C_{10}$ alkyl acrylates are preferred for use, especially the branched alkyl groups, for example, 2-ethylhexyl acrylate, since such branched alkyl groups give better physical properties to the resulting resin.

Mixtures of the respective alkyl acrylates and of the vinylphosphonates can be used, if desired.

One preferred copolymer from the standpoint of cost and performance is a terpolymer containing from about 55% to about 80%, by weight, vinyl chloride, from about 10% to about 35%, by weight of the $C_6$–$C_{10}$ alkyl acrylate, and from about 5% to about 25%, by weight, of a bis($C_2$–$C_8$ alkyl) or ($C_1$–$C_8$ haloalkyl)vinylphosphonate copolymerized therein. One terpolymer which can be used to form films having a Shore "A" hardness of about 60 to about 72 contains about 56%, by weight, of vinyl chloride, about 29% to about 31%, by eight, 2-ethylhexyl acrylate and about 11% to about 13%, by weight, of the vinylphosphonate, e.g., of bis(beta-chloroethyl)vinylphosphonate or of bis (2-ethylhexyl)-vinylphosphonate. For a harder film having a Shore "A" hardness of about 80 to about 90, a higher vinyl chloride content is needed. This is easily accomplished by raising the vinyl chloride content and correspondingly reducing the acrylate and vinylphosphonate content. For example a terpolymer having a Shore "A" hardness of about 85 to about 95 can contain about 73% to about 75%, by weight, vinyl chloride, about 17% to about 19%, by weight, of the $C_6$–$C_{10}$ alkyl acrylate, e.g., 2-ethylhexyl acrylate and about 7% to about 9%, by weight of the bis(hydrocarbyl)vinylphosphonate, e.g., bis(beta chloroethyl)vinylphosphonate.

The copolymer of the present invention can be formed using conventional bulk, emulsion, suspension and solution polymerization procedures. Suspension polymerization is preferred since it avoids the problems of isolation of the product from a latex that can be encountered using emulsion polymerization techniques, the heat of reaction is more readily removed as compared to bulk polymerization procedures, and no solvent recovery is needed as in solution polymerization.

Suspension polymerization reaction mixtures comprise from about 20% to about 45%, by weight, based on the amount of water, of the above-enumerated monomers in an aqueous reaction medium. Also included will be from about 0.05% to about 5%, by weight, based on the weight of monomers, of a suspending agent, such as methyl cellulose, hydroxypropyl methyl cellulose, gelatine, and the like; from about 0.005% to about 1%, by weight, based on the amount of monomer, of at least one-monomer-soluble initiator, such as azobisisobutyronitrile, lauroyl peroxide, benzoyl peroxide or isopropyl peroxydicarbonate. The polymerization reaction is conducted by heating the suspension containing the above components to a temperature of from about 35° C. to about 75° C. for about 2 to about 12 hours with agitation being applied throughout the course of the reaction. As is well known in the art, the use of the more active of the above mentioned initiators will require use of either a lower temperature or shorter reaction time, or both, whereas use of the less active initiators may require more vigorous reaction conditions. If desired the molecular weight of the polymers can be regulated by adding an effective amount of a chain transfer agent during the polymerization. Generally from about 0.01 to about 0.1%, by weight of the monomers, will be effective. Representative chain transfer agents include the chlorinated hydrocarbons, e.g., tetrachloroethane, trichloroethane and carbon tetrachloride, and mercaptans of the formula RSH, where R is an alkyl group, e.g., a $C_1$–$C_{12}$ alkyl group, such as butyl or dodecyl.

If emulsion polymerization is to be employed, the above described suspending agent is replaced with from about 0.2% to about 2%, by weight, of an emulsifying agent, such as sodium lauryl sulfate, potassium stearate, an alkyl benzene sulfonate, an ammonium dialkyl sulfosuccinate, and the like, and the monomer soluble initiator is replaced by from about 0.1% to about 1% of a water-soluble initiator, such as an alkali metal persulfate, perborate or peracetate, ammonium persulfate, perborate or peracetate, the urea peroxides, hydrogen peroxide, tertiary butyl hydroperoxide, and the like. If desired, a redox initiator system such as ammonium persulfate and sodium bisulfite or hydrogen peroxide and ascorbic acid can also be used as the initiator. Polymerization is carried out at similar temperatures and over similar times as those used in suspension polymerization.

If bulk polymerization is employed, the monomers are polymerized in the presence of the above-described amounts of the monomer-soluble catalysts under the same temperature and time conditions described above in connection with suspension and emulsion polymerization.

If solution polymerization is employed, the monomers are polymerized in the presence of at least one inert organic solvent, such as butane, pentane, octane, benzene, toluene, cyclohexanone, acetone, isopropanol, tetrahydrofuran or the like. The selected initiator should be soluble in the reaction medium. The copolymer can either remain dissolved in the solvent at the end of the polymerization or can precipitate from the liquid phase during the polymerization. In the former case, the product can be recovered by evaporation of the solvent or by precipitation of the polymer solution by combining it with a non-solvent for the product. The same reaction conditions used in suspension and emulsion polymerization can be used.

The final product of the present invention can contain, if desired, various optional additives which are compatible with the copolymer product and which do not adversely affect the properties of said product. Included within this class of additives are those heat and light stabilizers, ultraviolet stabilizers, pigments, fillers, dyes, and other additives known to persons of ordinary skill in the art. A suitable listing of possible additives which a person of ordinary skill in the art may use to select appropriate additives, if desired, is given in Modern Plastics Encyclopedia, Vol. 51, No. 10A, e.g., at pp. 735-754.

The following Examples illustrate certain preferred embodiments of the present invention:

EXAMPLE 1

This Example illustrates the generalized procedure which was used to form an internally plasticized resin in accordance with the present invention by suspension polymerization.

The following ingredients were used. All amounts are given in parts by weight:

| Ingredient | Amount |
| --- | --- |
| Vinyl chloride monomer | 100 |
| 2-ethylhexyl acrylate | 46.5 |
| Bis(beta-chloroethyl) vinylphosphonate | 19.95 |
| Hydroxypropylmethylcellulose suspending agent ("Methocel" K-35 from The Dow Chemical Co.) | 0.23 |
| 20 wt. % isopropylperoxydicarbonate in heptane | 0.54 |
| Deionized water | 423 |

The following procedure was used to polymerize the vinyl chloride, acrylate and vinylphosphonate monomers:

1. The suspending agent was dissolved in a portion of the deionized water and was charged into the reactor along with the remainder of the deionized water. The mixture was stirred briefly and the perioxydicarbonate/heptane initiator mixture was added;

2. The acrylate and vinylphosphonate monomers were added;

3. The reactor was closed, vacuum was applied (approx. 584.2–635 mm. of Hg. pressure) for 10 minutes to remove air from the reactor, and vinyl chloride monomer vapor was added to break the vacuum. This operation was repeated once and the vinyl chloride was charged into the reactor;

4. The agitator was set at 496 revolutions per minute and the reactor was heated to 50° C. until the pressure in the reactor dropped 4.2 kg./cm$^2$ from the maximum pressure noted near the beginning of the reaction;

5. The reactor was vented and sparged with nitrogen at a rate of 70.7 cubic cm./sec. for a 44 liter reactor for a period of 1 hour to remove residual monomer from the product;

6. The reactor was allowed to cool and the polymer particles were recovered by centrifuging. The particles were dried in a fluid bed drier using air at 30° C.;

7. The dried polymer was milled through a Fitz mill and was sieved through a 30 mesh screen.

Three repeats of the above procedure were conducted. The polymers which were obtained contained from about 57.4 to about 57.7%, by weight, vinyl chloride from about 29.7 to about 31.5%, by weight, 2-ethylhexyl acrylate and from about 11.1 to about 12.6%, by weight, bis(beta-chloroethyl)vinylphosphonate and had a relative viscosity of from about 2.74 to about 3.07 when measured as a 1%, by weight, solution of the copolymer in cyclohexanone. The feed composition in each case was a 60/28/12 weight percent composition of each of the respective monomers. The differences were due to minor uncontrollable variations in the above described reaction conditions.

EXAMPLE 2

This Example illustrates the physical properties of a series of film formulations made from the copolymer of the present invention. The following procedures were used to make each test sample:

Samples 1-3:

A compressible film formulation was made for each sample by mixing together the following ingredients in the following amounts:

| Ingredient | (Amount in Grams) | | |
| --- | --- | --- | --- |
| | 1 | 2 | 3 |
| Copolymer of this Invention* | 255 | 255 | 255 |
| Chlorinated Polyethylene | 45 | 45 | 45 |
| Epoxidized octyl tallate | 15 | 15 | 15 |
| Barium Cadmium liquid Stabilizer | 9 | 9 | 9 |
| Calcium stearate lubricant | 3 | 3 | 3 |
| Stearic acid lubricant | 3 | 3 | 3 |
| Calcium Carbonate filler | 90 | 90 | 90 |
| Titanium dioxide pigment | 12 | 12 | 12 |
| Acrylic Processing Aid ("K-175" sold by Rohm and Haas Co.) | 15 | — | — |
| Ethylene bisstearamide lubricant ("Lubrol EA" sold by I.C.I. Organics, Inc.) | 3 | 3 | — |
| Bisstearamide lubricant ("Advawax 240" | | | |

|                                                      | (Amount in Grams) | | |
|------------------------------------------------------|---|---|---|
| Ingredient                                           | 1 | 2 | 3 |
| sold by Cincinnati Milacron)                         | — | — | 3 |

*Sample 1 used a 57.4/31.5/11.1 copolymer of vinyl chloride (VC)/2-ethylhexyl acrylate (EHA)/bis(beta-chloroethyl)vinylphosphonate (BB) having a relative viscosity of 2.78. Sample 2 used a 57.6/30.9/11.5 copolymer having a relative viscosity of 3.07. Sample 3 used a 57.7/29.7/12.6 copolymer with a relative viscosity of about 2.8.

The ingredients mentioned in the above formulations were handmixed and were then milled on a 2 roll having the rolls at 310° F. (154° C.) and 315° F. (157° C.), respectively, for Sample 1 and 157° F. (160° C.) for Samples 2 and 3. After fluxing in the 2 roll mill for about 7 min., the milled stocks were compression molded at 320° F. (160° C.) to produce films having a thickness of from about 0.038 in. (0.09 cm.) to about 0.048 in. (0.12 cm.) for measurement of the physical properties according to various standard testing procedures.

Samples 4–7:

Compressible film formulations were formed from the following ingredients:

|                                  | (Amount in Grams) | | | |
|----------------------------------|-----|-----|-----|-----|
| Ingredient                       | 4   | 5   | 6   | 7   |
| Copolymer of this Invention*     | 300 | 300 | 300 | 300 |
| Epoxidized soybean oil           | 15  | —   | 15  | —   |
| Epoxidized octyl tallate         | —   | 15  | —   | 15  |
| Barium cadmium stabilizer (liq.) | 9   | 9   | 9   | 9   |
| Calcium stearate                 | 3   | 3   | 3   | 3   |
| Stearic acid                     | 3   | 3   | 3   | 3   |
| Bisstearamide lubricant          | 3   | —   | —   | —   |
| Ethylene bisstearamide lubricant | —   | 3   | 3   | 3   |

*the copolymer used in Samples 4 and 5 was the same copolymer used in Sample 1, whereas the copolymer used in Samples 6 and 7 was the same as that used in Sample 2.

The mill conditions for Samples 4 and 5 were the same as for Sample 1, and the conditions for Samples 6 and 7 were the same as for Samples 2 and 3.

Samples 8–11:

Compressible film formulations were formed from the following ingredients:

|                                  | (Amount in Grams) | | | |
|----------------------------------|-----|-----|-----|-----|
| Ingredient                       | 8   | 9   | 10  | 11  |
| Copolymer of this Invention*     | 255 | 255 | 225 | 150 |
| Chlorinated polyethylene         | 45  | 45  | 75  | 150 |
| Epoxidized octyl tallate         | 15  | 15  | 15  | 15  |
| Barium cadmium stabilizer (liq.) | 9   | 9   | 9   | 9   |
| Calcium stearate                 | 3   | 3   | 3   | 3   |
| Stearic acid                     | 3   | 3   | 3   | 3   |
| Calcium Carbonate                | 90  | 90  | 90  | 90  |
| Titanium Dioxide                 | 12  | 12  | 12  | 12  |
| Fused silica (Cab-O-Sil)         | 3   | —   | 3   | 3   |
| Ethylene bisstearamide lubricant | 3   | 3   | —   | —   |
| Bisstearamide lubricant          | —   | —   | 3   | 3   |

*the copolymer used in Sample No. 8 was the same as that used in Sample No. 1; the copolymers in Samples Nos. 9–11, the same as in Sample No. 2.

Sample No. 8 was milled using the same procedure as that used with Sample No. 1. Samples Nos. 9–11 were milled using the procedure for Samples Nos. 2 and 3.

Samples 12–13:

Compressible film formulations were formed from the following ingredients:

|                                | (Amount in Grams) | |
|--------------------------------|------|------|
| Ingredient                     | 12   | 13   |
| Copolymer of this Invention*   | 150  | 150  |
| Epoxidized soybean oil         | 7.5  | 7.5  |
| Calcium carbonate              | 45   | 45   |
| Titanium Dioxide               | 6    | 6    |
| Calcium stearate               | 1.5  | 1.5  |
| Stearic acid                   | 1.5  | 1.5  |
| Bisstearamide lubricant        | 1.5  | 1.5  |

*this consisted of 150 grams of a blend formed by admixing 1970 g. of the copolymer used in Sample No. 1, 3988 grams of the copolymer used in Sample No. 2 and 5080 grams of the copolymer used in Sample No. 3.

The samples were milled in accordance to the procedure used to mill Sample No. 1 with the rolls for Sample 12 being at (154°/157° C.) and those for Sample 13 at (138°/140.5° C.).

Table 1 which follows sets forth the physical properties for these thirteen samples.

TABLE 1

| PROPERTY | SAMPLE NO. | | | | | | |
|---|---|---|---|---|---|---|---|
|  | 1 | 2 | 3 | 4 | 5 | 6 | 7 |
| Clash-Berg Temperature (° C.)[1] | −27 | −30 | −28 | −23 | −28 | −28 | −37 |
| Shore "A" Hardness[2] | 67 | 69 | 64 | 65 | 61 | 68 | 58 |
| Tensile Strength, Break (kg./cm.$^2$)[3] | 72.1 | 80.8 | 63.4 | 115.6 | 97.7 | 106.4 | 91.5 |
| 100% Modulus (kg./cm.$^2$)[4] | 44.5 | 48.0 | 37.8 | 65.4 | 46.6 | 55.6 | 49.3 |
| Elongation at Break (%)[5] | 269 | 257 | 279 | 229 | 271 | 231 | 219 |
| Graves Tear Strength (kg./cm.)[6] | 20.3 | 23.7 | 20.1 | 24.4 | 19.6 | 24.8 | 18.3 |
| Flexural Modulus of Elasticity (kg./cm.$^2$)[7] | 54.1 | 81.5 | 49.9 | 54.8 | 44.2 | 84.3 | 37.9 |
| Hexane Permanence[8] | — | 4.6 | 5.5 | −6.9 | 6.8 | 6.6 | |
| Perchloroethylene Permanence[9] | — | 4.5 | 7.3 | — | 8.6 | 5.0 | 6.4 |
| % Volatile Weight Loss[10] | — | 1.0 | 1.7 | 1.5 | 1.8 | 1.8 | 1.6 |

|  | 8 | 9 | 10 | 11 | 12 | 13 |
|---|---|---|---|---|---|---|
| Clash-Berg Temperature (° C.)[1] | −30 | −30 | −29 | −31 | — | — |
| Shore "A" Hardness[2] | 58 | 69 | 65 | 62 | 76 | 76 |
| Tensile Strength, Break (kg./cm.$^2$)[3] | 80.2 | 80.8 | 62.5 | 62.0 | 105.5 | 106.1 |
| 100% Modulus (kg./cm.$^2$)[4] | 36.2 | 48.0 | 35.8 | 26.4 | 70.0 | 72.3 |
| Elongation at Break (%)[5] | 311 | 257 | 309 | 523 | 203 | 201 |
| Graves Tear Strength (kg./cm.)[6] | 19.8 | 23.7 | 23.0 | 28.3 | 26.4 | 24.6 |
| Flexural Modulus of Elasticity (kg./cm.$^2$)[7] | 40.0 | 81.5 | 78.7 | 74.5 | 147.6 | 140.6 |
| Hexane Permanence[8] | — | 4.6 | 6.0 | 6.0 | — | — |
| Perchloroethylene Permanence[9] | — | 4.5 | 9.3 | 8.6 | — | — |
| % Volatile Weight Loss[10] | — | 1.0 | 1.6 | 1.3 | — | — |

Footnotes:
[1]This is the temperature at which the apparent modulus of elasticity of a specimen is 9491.4 kg./cm.$^2$. It is the end of flexibility of the sample as defined by Clash and Berg in their studies of low temperature flexibility. This point can be determined by ASTM D 1043, which is incorporated herein by reference.
[2]This is a measure of indentation hardness and is measured on the Shore A durometer after 10 seconds ASTM Test Method No. D-2240). This instrument comprises a spring loaded indentor point with a load of 822 grams projecting through a hole in a presser foot. The device has a scale which indicates the degree of penetration into the plastic beyond the face of the foot. The scale ranges from 0 (for 0.254 cm. penetration) to 100 (for zero penetration).
[3]This is the maximum tensile stress sustained by a specimen of the resin during a tension test (ASTM D-882). The result is expressed in kilograms per Cm.$^2$, the area being that of the original specimen at the point of rupture rather than the reduced area after break.
[4]This is the tensile strength needed to elongate a specimen to 100% of its original length (ASTM D-822).
[5]In tensile testing elongation is the increase in length of a specimen at the instant before rupture occurs (ASTM D-882). Percent elongation is expressed as the increase in distance between two gauge marks at rupture divided by the original distance between the marks, the quotient being multiplied by 100.
[6]The Graves test (ASTM) was used to determine the tear strengths using specimens 0.10–0.127 cm. in thickness.
[7]The ratio of stress (nominal) to corresponding strain below the proportional limit of a material (ASTM-790). It is expressed in force per unit area.
[8]Measured at room temperature after 24 hours. The films were kept in hexane at room temperature for 24 hours, followed by oven drying in a forced air oven at 50° C. for three to four hours. The numbers give the percent weight loss of extractibles in the film. Lower numbers are desired.
[9]Measured at room temperature after 1 hour. The films were kept in perchloroethylene for 1 hour, followed by drying in a forced air oven at 50° C. for five hours. The numbers give thepercent weight loss of extractibles in the film. Lower numbersare desired.
[10]The films were placed in a container containing activated carbon and were heated at 90° C. for 24 hours. The volatile materials were absorbed by the carbon. The numbers represent the percent volatile weight loss from the film. Lower numbers are desired.

Samples 1–3 which are the internally plasticized resins of the present invention are all fairly alike in physical properties. Resin No. 3 is slightly softer than the first two resins.

Samples 4–7 show the effects that the addition of two epoxy stabilizers has on Resin Nos. 1 and 2. The epoxidized octyl tallate reduces the low temperature flexibility by about 5° to 7° C. at a concentration of 5 parts per hundred (based on 100 parts of resin) as compared to the epoxidized soybean oil. However, the use of the tallate additive effects the physical properties, e.g., lowers the hardness of the films as well as the tensile and tear strengths. The presence of these epoxy stabilizers increases both the light and heat stability of the resin.

Samples 8–11 show the effect of addition of chlorinated polyethylene to the resin and should be compared to Sample 5 as a control. In general, addition of as low as 15% by weight of chlorniated polyethylene improves the elongation with only a slight reduction of other desired characteristics.

Samples 12 and 13 illustrate the physical property data for the internally plasticized resin of the present invention processed at two different temperatures. The properties are essentially the same, which would allow a person of ordinary skill in the art to use the lower temperature.

EXAMPLE 3

This Example illustrates the mill heat stability of various internally plasticized resins made in accordance with the present invention.

Compressible film formulations were formed from the following ingredients for each of the enumerated samples:

| Ingredient | (Amount in Grams) | | | | |
|---|---|---|---|---|---|
| | 1 | 2 | 3 | 4 | 5 |
| Copolymer of the Invention* | 170 | 85 | 85 | 170 | 170 |
| Chlorinated polyethylene | 30 | 15 | 15 | 30 | 30 |
| Epoxidized octyl tallate | 10 | 5 | 5 | 10 | 10 |
| Barium cadmium stabilizer (liq.) | 6 | — | — | 6 | 6 |
| Calcium stearate | 2 | 1 | 1 | 2 | 2 |
| Stearate acid | 2 | 1 | 1 | 2 | 2 |
| Calcium carbonate | 60 | 30 | 30 | 60 | 60 |
| Titanium dioxide | 8 | 4 | 4 | 8 | 8 |
| Bisstearamide lubricant | 2 | 1 | 1 | 2 | 2 |
| Barium-cadmium-zinc-stabilizer | — | 3 | 3 | — | — |
| Phosphite chelator ("Mark C" sold by Argus Chemical) | — | 1 | 1 | — | 2 |

*the copolymer used in Samples 1—3 is the same as that used in Samples Nos. 12 and 13 from Example 2. The copolymer used in Sample No. 4 was the same as that used in Sample No. 1 from Example 2. The copolymer used in Sample No. 5 was a 59 VC/28 EHA/12 BB copolymer having a relative viscosity of about 2.86.

Table 2 which is set forth below gives the processing temperatures in the 2 roll mill, the type of stabilizer system that was used and comments on the appearance of the film.

TABLE 2

| Sample No. | Processing[1] Temperature | Stabilizer System[2] | | Comments |
|---|---|---|---|---|
| 1 | 121/124° C. | Ba-Cd: | 3phr | After 160 minutes of processing, there was |
| | | Epoxy Stab.: | 5phr | substantially no film color development compared to the initial film color after 10 minutes. |
| 2 | 138/141° C. | Ba-Cd-Zn: | 3phr | After 160 minutes of processing, there was |
| | | Epoxy Stab.: | 5phr | substantially no film color development compared to the initial film color after 10 |
| | | Phosphite Chelator: | 1phr | minutes |
| 3 | 157/160° C. | Ba-Cd-Zn: | 3phr | At about 90 minutes, the film surface be- |
| | | Epoxy Stab.: | 5phr | came rough and a very slight yellow color |
| | | Phosphite Chelator: | 1phr | developed. |
| 4 | 157/160° C. | Ba-Cd: | 3phr | At about 80 minutes, the film surface be- |
| | | Epoxy Stab.: | 5phr | came rough with a slight development of yellow color |
| 5 | 157/160° C. | Ba-Cd: | 3phr | At about 90 minutes, the film surface be- |
| | | Epoxy Stab.: | 5phr | came rough with slight development of |
| | | Phosphite | | yellow color |

TABLE 2-continued

| Sample No. | Processing[1] Temperature | Stabilizer System[2] | Comments |
|---|---|---|---|
| | | Chelator: | 1phr |

Footnotes:
[1]The milling was carried out on a two roll mill operated at the temperature values set forth in Table 2. The temperature before the slash refers to the front roll, whereas the one after the slash the back roll.
[2]Ba-Cd and Ba-Cd-Zn stand for barium-cadmium and barium-cadmium-zinc heat stabilizers, respectively. The epoxy stabilizers used were epoxidized soybean oil and epoxidized octyl tallate. The phosphite chelator is available commercially as "Mark C" from the Argus Chemical Co. All parts per hundred (phr) are based on the resin as 100 parts by weight.

EXAMPLE 4

This Example gives the results of smoke measurement tests conducted in a commercial smoke density chamber modeled after one developed at the National Bureau of Standards by the Fire Research Group (See D. Gross, J. J. Loftus and A. F. Robertson, ASTM Special Technical Publication 422, pages 166–204, 1969). This chamber contains a radiant heater producing 2.5 W/cm.$^2$ of heat at the surface of a 7.62 cm. × 7.62 cm. sample, a propane-air pilot burner and a vertical beam of light with a photomultiplier tube detector and microphotometer to record the attenuation of light by smoke developing in the chamber. During smoke testing, the chamber is sealed to enclose the combustion products and smoke. The tests were conducted under the smoldering mode (Table 3) as well as the flaming mode (Table 4). The values shown in parenthesis are from duplicate runs.

TABLE 3

| SAMPLE DESCRIPTION | FR ADDITIVE (PHR) | WEIGHT OF SAMPLE (grams) | Dm = MAXIMUM[4] SPECIFIC OPT. DENSITY | Dm/Gm of[5] ORIGINAL SAMPLE | Dm/Gm[6] OF MASS LOSS | LOI[7] |
|---|---|---|---|---|---|---|
| PVC + 55 phr dioctyl phthalate[1] | None | 2.1 | 126 | 60 | 140 | 21.4 |
| PVC + 55 phr dioctyl phthalate[1] | Sb$_2$O$_3$ (5) | 2.5 | 140 (142) | 56 | 128 | 27.1 |
| Internally Plasticized Resin[2] | None | 2.7 (2.9) | 53 (52) | 19 (18) | 50 (36) | 22.2 |
| Internally Plasticized Resin[2] | Sb$_2$O$_3$ (5) | 3.0 (3.4) | 37 (53) | 12 (15) | 29 (34) | 28.4 |
| Internally Plasticized Resin[3] | None | 2.4 (2.7) | 51 (52) | 21 (19) | 43 (41) | 23.3 |
| Internally Plasticized Resin[3] | Sb$_2$O$_3$ (5) | 2.5 (2.8) | 40 (45) | 16 (16) | 32 (32) | 28.6 |

TABLE 4

| SAMPLE DESCRIPTION | FR ADDITIVE (phr) | WEIGHT OF SAMPLE (grams) | Dm = MAXIMUM SPECIFIC OPT. DENSITY | Dm/Gm OF ORIGINAL SAMPLE | Dm/Gm OF MASS LOSS |
|---|---|---|---|---|---|
| PVC + 55 phr dioctyl phthalate[1] | None | 1.9 (2.0) | 117 (117) | 61 (58) | 105 (94) |
| PVC + 55 phr dioctyl phthalate[1] | Sb$_2$O$_3$ (5) | 2.5 (2.5) | 195 (168) | 78 (67) | 135 (110) |
| Internally Plasticized Resin[2] | None | 3.2 (2.7) | 125 (124) | 39 (46) | 78 (83) |
| Internally Plasticized Resin[2] | Sb$_2$O$_3$ (5) | 3.4 (3.4) | 138 (144) | 40 (42) | 73 (78) |
| Internally Plasticized Resin[3] | None | 2.5 (2.2) | 88 (99) | 35 (45) | 68 (82) |
| Internally Plasticized Resin[3] | Sb$_2$O$_3$ | 2.9 | 110 | 37 | 81 |

TABLE 4-continued

| SAMPLE DESCRIPTION | FR ADDITIVE (phr) | WEIGHT OF SAMPLE (grams) | Dm = MAXIMUM SPECIFIC OPT. DENSITY | Dm/Gm OF ORIGINAL SAMPLE | Dm/Gm OF MASS LOSS |
|---|---|---|---|---|---|
| | (5) | (2.6) | (114) | (43) | (77) |

Footnotes:
[1]The polyvinyl chloride (PVC) resin is a high molecular weight PVC resin developed for calendered goods applications and is available commercially as SCC-686 from Stauffer Chemical Company, Plastics Division. The dioctyl phthalate (an external plasticizer) is available under the tradename "6-10 Phthalate" from Hatco Chemicals.
[2]The copolymer of the present invention. This particular sample contained the same copolymer that was used in Example 2, Sample Nos. 12 and 13.
[3]Another embodiment of the present invention. This particular sample contained a 63.4 VC/ 27.4 EHA/ 9.2 BB copolymer having a relative viscosity of 2.89.
[4]The maximum specific optical density gives a measure of the smoke buildup during the test. Lower numbers indicate less obstruction of light due to smoke and are preferred. Dm=25, light smoke; 25-75 moderate smoke; 100-400, dense smoke; 400, very dense smoke.
[5]This gives a corrected value for the maximum smoke generation per unit weight of sample. Lower numbers are desired.
[6]This value represents the smoke generation per unit weight of material consumed during the burning process. Lower numbers are again desired.
[7]This is an abbreviation for the Limiting Oxygen Index and is defined as the minimum mole percent $O_2$ content required in an oxygen/nitrogen mixture to maintain combustion of a vertical, top-lighted test specimen. Higher numbers are indicative of a more fire retardant material.

Analysis of the data presented in Tables 7 and 8 show that under smoldering conditions, a film of the internally plasticized resin of the present invention containing no fire retardant additives produces approximately 65-68% less smoke compared to a similar externally plasticized film whether or not these data are based on unit mass of the original sample tested or unit mass of the original sample consumed during the testing process. Similarly, again under smoldering test conditions, a similar film containing a fire retardant-additive produces even better smoke reduction (e.g., 78% reduction) compared to an externally plasticized film containing a similar fire retardant additive. Under flaming modes of burning, the internally plasticized films of the present invention again show less smoke generation as compared to externally plasticized film, i.e., approximately 30% less for films containing no fire retardant additives and approximately 50% for films containing fire retardant additives.

EXAMPLE 5

This Example illustrates the generalized procedure which was used to form an internally plasticized resin having a higher vinyl chloride content than the copolymer formed in Example 1 and to blends of this copolymer with another internally plasticized polymer.

The following ingredients were used. All amounts are given in parts by weight:

| Ingredient | Amount |
|---|---|
| Vinyl chloride monomer (VCM) | 50 lbs. 13¼ oz. |
| 2-ethylhexyl acrylate (2-EHA) | 11 lbs. 9 oz. |
| Bis-(beta-chloroethyl)vinyl-phosphonate (BB) | 4 lbs. 12 oz. |
| Methylcellulose suspending agent ("Methocel" 1242 from The Dow Chemical Co.) | 30 grams |
| 20 wt. % isopropylperoxydicarbonate in heptane | 85 grams |
| Deionized water | 74.85 kg. |

The following procedure was used to polymerize the vinyl chloride, acrylate and vinylphosphonate monomers:

1. The suspending agent was dissolved in a portion of the deionized water and was charged into the reactor along with the remainder of the deionized water. The mixture was stirred briefly and the peroxydicarbonate/heptane initiator mixture was added;
2. The acrylate and vinylphosphonate monomers were added;
3. The reactor was closed, vacuum was applied (approx. 584.2-635 mm. of Hg. pressure) for 10 minutes to remove air from the reactor, and vinyl chloride monomer vapor was added to break the vacuum. This operation was repeated once and the vinyl chloride monomer was charged into the reactor;
4. The agitator was set at 351 revolutions per minute and the reactor was heated to 50° C. until the pressure in the reactor dropped 4.2 kg./cm.$^2$ from the maximum pressure noted near the beginning of the reaction:
5. The reactor was vented and sparged with nitrogen at a rate of 70.7 cubic cm./sec. for a 44 liter reactor for a period of 1 hour to remove residual monomer from the product;
6. The reactor was allowed to cool and the polymer particles were recovered by centrifuging. The particles were dried in a fluid bed drier using air at 30° C.;
7. The dried polymer was milled through a Fitz mill and was sieved through a 30 mesh screen.

The resin that was produced from the 76% VC/17.3% 2-EHA/6.7% BB feed composition had a 73.6% VC/18.2% 2-EHA/8.2% BB composition and a relative viscosity of 2.72 when measured at 25° C. as a 1% by weight solution of the copolymer in cyclohexanone.

This resin and combinations of the resin with the 57.4% VC/31.5% 2-EHA/11.1% BB resin from Example 2 (Samples 12-13) were fabricated into film forming compositions by mixing together the following ingredients in the following amounts:

| Ingredient | (Amount of Grams) 1 | 2 | 3 |
|---|---|---|---|
| Copolymer of Example 2 (Samples 12-13) | — | 70 | 60 |
| Copolymer of Example 5 | 100 | 30 | 40 |
| Epoxidized Soybean Oil | 5 | 5 | 5 |
| Barium Cadmium liquid stabilizer | 3 | 3 | 3 |
| Phosphite chelator ("Mark C", sold by Argus Chemical Corp.) | 1 | 1 | 1 |
| Calcium stearate | 1 | 1 | 1 |
| Stearic acid | 1 | 1 | 1 |
| Bisstearamide lubricant | 1 | 1 | 1 |
| Calcium carbonate filler | 30 | 30 | 30 |
| Titanium dioxide pigment | 4 | 4 | 4 |

The above formulations were calendered into a film on a 2 roll mill, 310°/315° F. (154°/157° C.) for all samples, at 30/42 rpm after all ingredients had been mixed and fluxed for about 7 minutes. The samples were compression molded at 320° F. (160° C.) to produce films with a thickness of about 0.09 to 0.12 cm. The Table which follows sets forth the physical properties of the samples that were tested.

initiator 10% by weight of isopropylperoxydicarbonate in heptane and hydroxypropylmethylcellulose (1% by weight solution) as the suspending agent.

TABLE

| TERPOLYMER* | INGREDIENTS* (parts by weight) | | | | | | | |
|---|---|---|---|---|---|---|---|---|
| | H₂O | Suspend. Agent | BB | BA | EA | Chain Trans.** Agent | Initiator | VCM |
| 1. 65% VC/20% BA/15% BB | 350 | 45 | 15 | 20 | — | 0.05 | 2.5 | 65 |
| 2. 81% VC/5% BA/14% BB | 350 | 45 | 14 | 5 | — | — | 2.5 | 81 |
| 3. 40% VC/20% EA/40% BB | 350 | 45 | 40 | — | 20 | — | 2.5 | 40 |
| 4. 60% VC/20% EA/20% BB | 350 | 45 | 20 | — | 20 | — | 2.5 | 60 |
| 5. 60% VC/30% EA/10% BB | 350 | 45 | 10 | — | 30 | — | 2.5 | 60 |
| 6. 75% VC/10% EA/15% BB | 350 | 45 | 15 | — | 10 | — | 2.5 | 75 |

*the abbreviations are as follows: BB = bis(beta-chloroethyl)vinylphosphonate; BA = butyl acrylate; VCM = vinyl chloride monomer; EA = ethyl acrylate. The weight amounts of reactants for terpolymer Nos. 1 and 2 were reacted in each of four bottles and the product from each was combined. The weight amounts for the remaining terpolymers were each reacted in a single bottle.
**the chain transfer agent was 0.05 ml. of t-dodecyl mercaptan.

| | SAMPLE NO. | | |
|---|---|---|---|
| | 1* | 2** | 3*** |
| Clash Berg Temperature (° C.) | −4 | −19 | −16 |
| Shore "A" Hardness | 95 | 84 | 86 |
| Tensile Str. at Break (kg/cm²) | 155.6 | 108.9 | 106.2 |
| 100% Modulus (kg./cm.²) | 148.4 | 94.4 | 98.1 |
| Elongation of Break (%) | 135 | 153 | 135 |
| Graves Tear Strength (kg/cm.) | 52.2 | 29.5 | 32.4 |
| Flexural Modulus of Elasticity (kg./cm.²) | 630.6 | 261.8 | 197.5 |

*The copolymer used in this example is a copolymer formed in accordance with Example 5.
**The copolymer used in this sample is a blend of 70%, by weight, of the copolymer from Example 2 (Samples 12-13) and 30%, by weight, of the copolymer from Example 5.
***The copolymer used in this sample is a blend of 60% of the copolymer from Example 2 (Samples 12-13) and 40% of the copolymer from Example 5.

The data presented in the preceding Table illustrates that a variation of the physical properties and hardness of the flexible vinyl films can be achieved by incorporating the "hard" and "soft" embodiments of the present copolymer films in varying ratios in the formulations.

Each of the terpolymers set forth on the preceding Table was then formed into compressible film formulations using the procedures described in Example 2 using the following ingredients. All amounts are given in parts by weight.

| Ingredient | Amount |
|---|---|
| Terpolymer resin | 100 |
| Epoxidized soybean oil ("G-62", sold by Rohm and Haas Co.) | 5 |
| Barium cadmium powder stabilizer ("V-1541", sold by Tenneco Chemicals, Inc., Intermediates Div.) | 1.5 |
| Phosphite chelator stabilizer ("V-1542", sold by Tenneco Chemicals, Inc., Intermediates Div.) | 1.5 |
| Calcium stearate lubricant | 0.5 |
| Stearic acid lubricant | 0.5 |

Each product was then tested for the various physical properties reported on the Table which follows:

TABLE

| | SAMPLE NO. | | | | | |
|---|---|---|---|---|---|---|
| | 1 | 2 | 3 | 4 | 5 | 6 |
| Clash-Berg Temperature (° C.) | NA | NA | 0 | NA | NA | NA |
| Shore "A" Hardness | 98 | 96 | 72.5 | 90 | 99 | 96 |
| Tangent Modulus of Elasticity (kg/cm²) | 1212.4 | 11,139.9 | 23.0 | 1328.2 | 1722.5 | 9431.1 |
| Tensile St., Break (kg/cm²) | 182.3 | 14.1 | 108.1 | 242.0 | 237.7 | 60.3 |
| % Elongation, Break | 103 | 0 | 215 | 67 | 83 | 0 |
| Secant Modulus at 100% Elongation (kg/cm²) | NA | NA | 92.2 | NA | NA | NA |

Note:
For those films for which "NA" appears for the Clash-Berg value, they were judged to be physically more rigid than Sample No. 3 and hence would have a Clash-Berg value above 0° C. This value was not experimentally determined for these samples. Of all the samples tested, only Sample No. 3 shows some degree of flexibility.
Secant modulus is the ratio of total stress to corresponding strain at a specified point in the stress-strain curve. It is expressed as force per unit area with higher numbers generally indicating more rigid materials.
Tangent modulus is the slope of the line at any point on a static stress-strain curve expressed as force per unit area. Where "NA" appears, it indicates that the value could not be obtained since the sample broke before 100% elongation was reached, or in the case of Sample No. 1, the value was not measured. Higher values also generally indicate a more rigid sample.

EXAMPLE 6

This Example illustrates that use of alkyl acrylate comonomers having alkyl groups that contain less carbon atoms than specified for the acrylates used herein do not function as internally plasticized resins as that term is used herein.

The terpolymers listed on the Table which follows were formed by suspension polymerizing the ingredients also listed in the Table for 13 hours at about 46° C. All amounts are given in parts by weight using as the The data which is presented in the preceding Table illustrates that use of the lower alkyl acrylates (for example, the $C_2$ or $C_4$ alkyl acrylates) in a terpolymer of vinyl chloride and a bis(hydrocarbyl)vinylphosphonate does not yield an internally plasticized resin, as does use of the higher alkyl acrylates (for example, the $C_8$ alkyl acrylates), as contemplated by the present invention.

The foregoing Examples illustrate certain preferred embodiments of the present invention but should not be construed in a limiting sense. The scope of protection which is sought is given in the claims which follow.

What is claimed:

1. An internally plasticized copolymer of:
    a. from about 50% to about 85%, by weight, of vinyl chloride;
    b. from about 3% to about 47%, by weight, of a $C_6$–$C_{10}$ alkyl acrylate; and
    c. from about 3% to about 47%, by weight, of a bis(hydrocarbyl)vinylphosphonate.

2. A copolymer as claimed in claim 1 wherein the vinyl chloride is from about 55% to about 80%, by weight, of the copolymer.

3. A copolymer as claimed in claim 1 wherein the $C_6$–$C_{10}$ alkyl acrylate is from about 10% to about 35%, by weight, of the copolymer.

4. A copolymer as claimed in claim 1 wherein the vinylphosphonate is a bis($C_1$–$C_8$ alkyl or haloalkyl)vinylphosphonate and is present at from about 5% to about 25%, by weight, of the copolymer.

5. A copolymer as claimed in claim 1 wherein the acrylate is 2-ethylhexyl acrylate.

6. A copolymer as claimed in claim 1 wherein the vinylphosphonate is selected from the group consisting of bis(beta-chloroethyl)vinylphosphonate and bis(2-ethylhexyl)vinylphosphonate.

7. A copolymer as claimed in claim 1 wherein the vinylphosphonate is bis(beta-chloroethyl)vinylphosphonate.

8. A copolymer as claimed in claim 1 which consists essentially of from about 56% to about 58% vinyl chloride, about 29% to about 31% by weight of a $C_6$–$C_{10}$ alkyl acrylate and about 11% to about 13% by weight of bis(beta-chloroethyl)vinylphosphonate.

9. A copolymer as claimed in claim 8 wherein the acrylate is 2-ethylhexyl acrylate.

10. A copolymer as claimed in claim 9 which contains from about 56% to about 58% vinyl chloride, from about 29 to about 31% by weight 2-ethylhexyl acrylate, and from about 11 to about 13% by weight of a compound selected from the group consisting of bis(beta chloroethyl)vinylphosphonate, bis(2-ethylhexyl)vinylphosphonate, or mixtures thereof.

11. A copolymer as claimed in claim 1 which consists essentially of from about 73% to about 75%, by weight, vinyl chloride, from about 17% to about 19% by weight of the $C_6$–$C_{10}$ alkyl acrylate and from about 7% to about 9%, by weight of bis(beta chloroethyl)vinylphosphonate.

12. A copolymer as claimed in claim 1 wherein the alkyl acrylate is a $C_8$–$C_{10}$ alkyl acrylate.

13. A copolymer as claimed in claim 8 wherein the alkyl acrylate is a $C_8$–$C_{10}$ alkyl acrylate.

14. A copolymer as claimed in claim 11 wherein the alkyl acrylate is a $C_8$–$C_{10}$ alkyl acrylate.

* * * * *

UNITED STATES PATENT AND TRADEMARK OFFICE
CERTIFICATE OF CORRECTION

PATENT NO. : 4,147,853
DATED : April 3, 1979
INVENTOR(S) : Jagadish C. Goswami et al.

It is certified that error appears in the above-identified patent and that said Letters Patent are hereby corrected as shown below:

Col. 1, line 18, "it" should be -- is --;

Col. 1, line 42, -- containing -- should appear before "vinyl chloride";

Col. 2, line 8, "comomers" should be -- comonomers --;

Col. 4, line 9, -- to about 58% -- should appear after "56%";

Col. 4, line 10, "by eight" should be -- by weight --;

Col. 7, line 10, -- mill -- should appear after "2 roll";

Col. 7, line 12, "157°F. (160°C.)" should read --157°C. and 320°F. (160°C.) --;

Col. 7-8, Table 1, the values for Hexane Permanence for Sample Nos. 5-7 should read -- 6.9 --; -- 6.8 --; and -- 6.6 --, respectively and no value should be given for Sample No. 4.

Col. 10, line 37, "Stearate acid" should be -- Stearic acid --.

Signed and Sealed this

Thirtieth Day of October 1979

[SEAL]

Attest:

RUTH C. MASON
Attesting Officer

LUTRELLE F. PARKER
Acting Commissioner of Patents and Trademarks